May 21, 1957 W. A. FOURIER 2,793,177

SYNTHETIC DEAD METAL

Filed Sept. 2, 1954 2 Sheets-Sheet 1

INVENTOR
WALTER A. FOURIER
BY Moore, Prangley & Clayton
ATTORNEY

May 21, 1957 W. A. FOURIER 2,793,177

SYNTHETIC DEAD METAL

Filed Sept. 2, 1954 2 Sheets-Sheet 2

INVENTOR
WALTER A. FOURIER
BY Moore, Prangley & Clayton

ATTORNEYS

United States Patent Office 2,793,177

Patented May 21, 1957

2,793,177

SYNTHETIC DEAD METAL

Walter A. Fourier, Chicago, Ill., assignor to Tenak Products Company, Chicago, Ill., a corporation of Illinois Application September 2, 1954, Serial No. 453,915

13 Claims. (Cl. 204—6)

This invention relates to the art of printing and particularly to a material for filling the non-printing area of printing plates before making electrotypes, printing plates having the non-printing area thereof filled, and the method of preparing electrotypes from such a printing plate.

In printing plates and particularly in engraved plates there are present in addition to the raised printing areas certain raised non-printing areas which are referred to as "dead metal." When making proofs from such engraved plates it is desirable first to remove or rout out the dead metal from the non-printing area. This is particularly desirable for example when making high quality color proofs especially when the non-printing area of one plate falls upon a printing area of another plate of another color.

If the dead metal is left in the plate, "frisketing" must be resorted to. This involves making paper masks which cover the dead metal when the proof is made. This is especially expensive when isolated areas must be "frisketed" as the paper masks must be replaced after each inking of the plate, each time a proof is made. The paper masks also cause difficulty as they indent the paper slightly, causing a faulty impression on the next color. Also, they tend to lift the printing cylinder away from the plate, causing difficulty in duplicating these proofs after the electrotypes are made.

Although removal or routing of the dead metal is desirable and economical to enable the engraver to check the engraved plate it is desirable that the dead metal be present or replaced when the engraved plate is duplicated by the electrotyping process to make electrotypes. Heretofore the routed areas have been filled with material usually sheet lead which is cut to suitable shape and adhered to the engraved plate in the routed area. The routing however is rarely uniform in depth and, accordingly, the added lead sheets present high and low spots according to the contour of the routed undersurface. It therefore is necessary to rout further in order to level the printing surface. This method and other methods which have been used to restore the dead metal to the non-printing areas are expensive and time consuming.

Accordingly, it is an object of the present invention to provide an improved material and method for building-up the routed non-printing areas on printing plates.

Another object of the invention is to provide an improved material for filling in the routed non-printing area of engraved plates which can be applied quickly and inexpensively.

Still another object of the invention is to provide an improved material for filling the routed non-printing areas of printing plates which will permit the use of a thermoplastic molding sheet in making the electrotype matrix.

Yet another object of the invention is to provide an improved method of preparing electrotypes.

A further object of the invention is to provide a printing plate having the routed non-printing areas thereof filled with improved dead metal packing material.

These and other objects and advantages of the invention will be better understood from the following description when taken in conjunction with the accompanying drawings. Referring to the drawings wherein like reference numerals have been utilized to designated like parts throughout;

Figure 1:
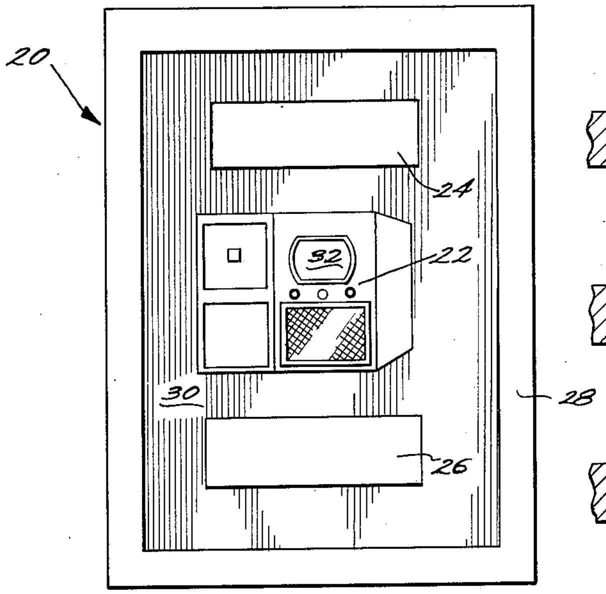
Figure 1 is a plan view of a printing plate, the non-printing areas of which have been routed.

Referring to Figure 1 there is shown a printing plate 20 to which the present invention is adapted to be applied. Printing plate 20 includes an engraved printing area 22, other printing areas 24 and 26, a border 28 and non-printing areas 30 and 32. As may be best seen in Figure 3 plate 20 when first engraved may have a printing surface 34 bounded on each side by non-printing surfaces 36 and 38 which are separated from printing surface 34 by channels 40. In order to take clean proofs of plate 20 it is necessary to rout out the so-called dead metal forming non-printing areas 36 and 38 to form relieved or routed surfaces 42 or 44, see Figure 4. After proofs of printing plate 20 have been taken and it is determined that the printing plate is in condition to be reproduced by the electrotype method, it is desirable to fill in the space left by removing the non-printing surfaces 36 and 38 so that the matrix material is not used-up in filling the routed non-printing areas.

The present invention contemplates filling the routed non-printing areas by suitable filling or packing material comprising a compressible fibrous sheet material impregnated with a thermosetting resin and adhered to the printing plate by an adhesive layer. The packing material is applied by placing a sheet of the material cut to the desired shape into routed non-printing areas of the printing plate and heating the material to an elevated temperature while holding it under elevated pressure. This adheres the packing material to the printing plate, molds the material to the proper height, and cures the thermosetting resin.

When a thermoplastic molding sheet is used in making the electrotype matrix, a thin sheet of aluminum is preferably adhered to the outer surface of the packing or filling material to prevent the thermoplastic molding sheet from sticking to the packing material.

Figure 2:
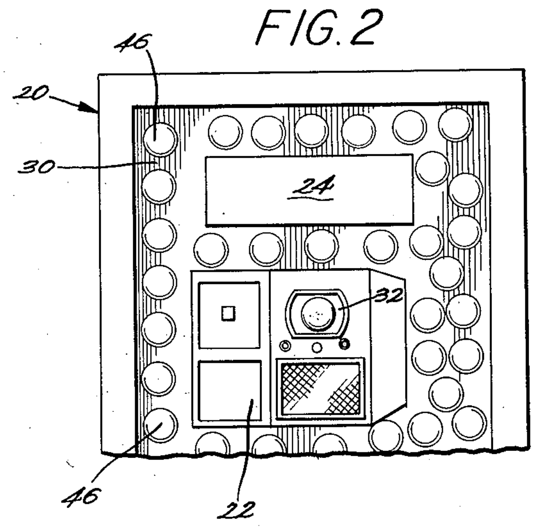
Figure 2 is a partial view of the printing plate of Figure 1 with one form of the present invention applied thereto to fill partially the routed non-printing areas thereof.

Referring to Figure 2 there is shown the printing plate 20 to which has been applied a plurality of circular packing discs 46 made according to the present invention and adhered to the plate 20 in the routed non-printing areas 30 and 32 thereof. In making an electrotype from plate 20 a matrix is first molded upon the face of the plate from any suitable molding material such as wax or a plastic molding sheet such as a thermoplastic molding sheet. The molded matrix is then stripped from sheet 20 and the molded surface of the matrix is coated with a conducting material such as graphite or a thin film of silver. A shell is then plated upon the coated matrix by suspending the coated matrix in a plating bath and depositing a layer of copper and/or nickel thereon to the desired thickness. The electrotype shell so formed is then separated from the matrix and has applied thereto a suitable backing material. The surface of the electrotype shell is an accurate reproduction of the surface of plate 20.

Figure 14:
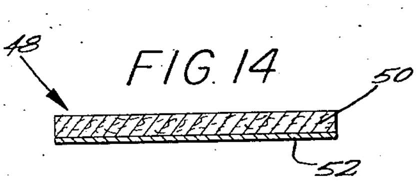

There is shown in Figure 14 one form of packing or filling material made in accordance with and embodying the principles of the present invention and designated by the numeral 48. Packing material 48 includes a layer of impregnated paper 50 and an adhesive layer 52. Layer 50 is a phenolic resin impregnated creped paper which is capable of undergoing considerable compression and which hardens to a firm and rigid form under the action of heat. Preferably the paper layer 50 is about 0.045 inch thick. The adhesive layer 52 is formed of a material sold under the trade name "Pliobond" and is a solution of a vinyl resin and synthetic rubber in methyl ethyl ketone.

In the case of certain printing plates having deeply routed areas it may be necessary to superimpose several resin impregnated sheets 50. This is done by applying an adhesive coating 52 between each sheet material layer 50 and then applying an adhesive layer 52 to the exposed side of the bottommost paper sheet 50. In one preferred example three sheets 50 are adhered together and supplied with an outer adhesive layer 52.

Figure 15:
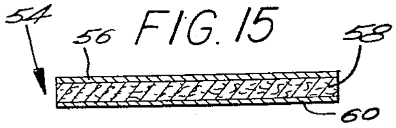

If a thermoplastic molding sheet is used in making the electrotype matrix, there is a tendency of the thermoplastic sheet to stick to the fibrous thermosetting packing material 48. To prevent this, an aluminum sheet is applied to the upper surface of the packing material. There is shown in Fig. 15 a packing material 54 including an aluminum sheet 56, a layer of thermosetting resin impregnated fibrous material 58 and an adhesive layer 60. Aluminum sheet 56 is preferably formed of a sheet of soft aluminum that is 0.0055 inch thick. Layer 58 is identical with layer 50 described above and adhesive layer 60 is identical to adhesive layer 52 described above.

In making packing material 54, the sheet of soft aluminum 56 which is 0.0055 inch thick is sprayed or otherwise coated with a layer of an adhesive such as "Pliobond." A sheet of phenolic resin impregnated creped paper 58 is placed on the adhesive coated aluminum sheet. The assembly is then pressed in a cold press to a thickness of about 0.040 inch. The paper side of the assembly is thereafter sprayed or otherwise coated with a layer of the adhesive. The packing material so formed is useful in filling routed areas having a depth of 0.012 to 0.025 inch.

If the routed area being filled has a greater depth, it may be necessary to apply two, three or even more layers of the phenolic resin impregnated creped paper. In one preferred example a sheet of soft aluminum 0.0055 inch thick is sprayed with an adhesive and a sheet of impregnated paper of 0.045 inch thick is placed thereon. The exposed side of the paper layer is coated with the adhesive and another sheet of impregnated paper about 0.040 inch thick is placed thereon. The exposed side of the second paper layer is coated with adhesive and another sheet of impregnated paper 0.040 inch thick is placed thereon. The assembly is then pressed in a cold press to a thickness of approximately 0.070 inch. The paper side of the assembly is thereafter coated with a layer of the adhesive. The resultant material is used to fill routed areas having a depth of about 0.040 to 0.055 inch. If only two paper layers are used the assembly is pressed to a thickness of about 0.060 inch thickness, the product so formed being used to fill routed areas having a depth of about 0.025 to 0.040 inch.

Figure 10:
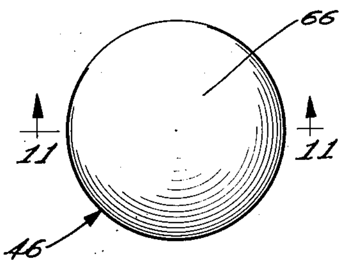
Figure 10 is an enlarged view of one form of filling material made according to the present invention.
Figure 11:
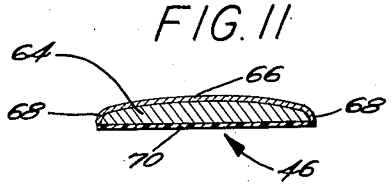
Figure 11 is a cross section of the material of Figure 10 as seen in the direction of the arrows along the line 11—11.

The packing material 54 may be used in large sheets or is preferably cut into standard shapes to fit in the routed non-printing areas. One of the preferred shapes is a circular shape which is illustrated in Figs. 10 and 11 of the drawings and which is used to illustrate the use of the present invention in the other figures of the drawings. Referring particularly to Fig. 11 it will be seen that this form of packing material which is generally designated by the numeral 46 has a layer of resin impregnated paper 64 which is covered by an aluminum sheet 66. In the cutting operation the edges 68 of the aluminum sheet are crimped downwardly over the edges of the paper sheet 64 and thereby serve to confine sheet 64. The bottom of sheet 64 is covered with an adhesive layer 70 of the type described above.

Referring now particularly to Figs. 6 through 9 of the drawings, the manner of applying packing material 46 to the plate 20 will be described in detail. The surface of plate 20 is first cleaned thoroughly. The routed non-printing areas are then filled with packing material pieces 46. A suitable thickness of pieces 46 is chosen so that the upper edge of the packing material 46 extends above the printing surface 34. As has been explained above the thickness of the packing material 46 can be varied by adding additional layers of resin impregnated paper during manufacture. Packing pieces 46 are positioned with the adhesive layer 70 positioned adjacent the metal surface and with the aluminum layer facing outwardly and above the printing surface. A clean and smooth metal plate made for example of copper, aluminum or zinc is placed over the printing plate. The assembly of the printing plate, the packing material and the metal plate is then placed in a hot press having a lower platen 74 and an upper platen 76 with gauge bearers 72 positioned on each side of the plate on platen 74. The height of bearers 72 is chosen so that the desired height of the thermoset packing material is obtained. In most cases the gauge bearers 72 are of a height equal to the height of the printing surface 34. The upper platen 76 is then lowered against the gauge bearers 72. The press is held in the closed position for four minutes. At the end of four minutes the adhesive has been activated and the thermosetting resin in the paper layers is set in the position to which the packing pieces 46 have been shaped by the press. Since the packing pieces 46 can be deformed during the heating and pressing operation they will conform to even irregularly routed plates giving a smooth surface as determined by the height of gauge bearers 72.

In certain instances it is desirable that the packing pieces 46 be removed from printing plate 20 after molding. It has been found that the adhesion of the packing pieces 46 to plate 20 can be suitably altered by sprinkling a light layer of talcum powder in the routed areas before placing the pieces 46 thereon, an excess of talcum powder being carefully avoided. The presence of the talcum powder provides for adequate adhering during molding of the matrix yet makes it possible to remove pieces 46 easily after the molding operation is finished.

Figure 8:
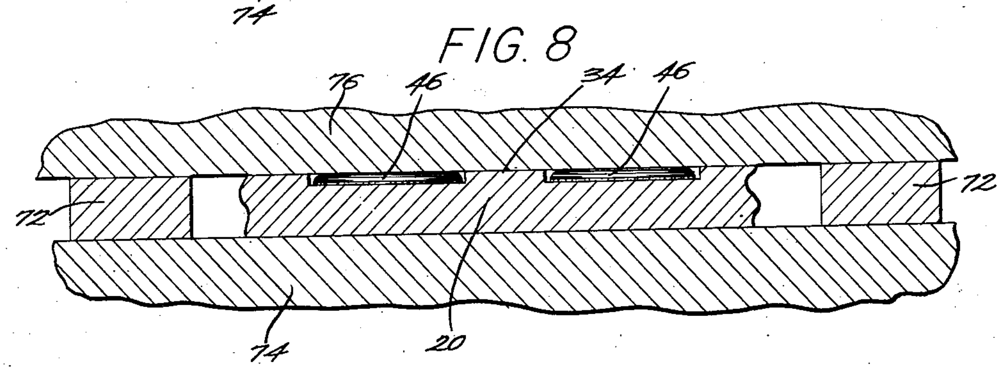
Figure 8 is a view similar to Figure 7 showing the press closed.
Figure 9:
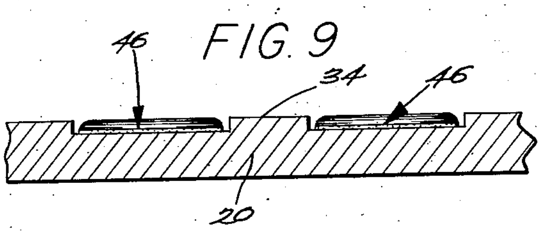
Figure 9 is a view showing the finished product made by the process of Figures 7 and 8.

When the press which is shown in the closed position in Fig. 8 is opened, the printing plate 20 can be removed and is now ready for use in forming matrices for use in preparing electrotypes. The molded packing pieces 46 now have the upper surfaces flat and aligned at the proper height with respect to the printing surfaces 34. The usual methods of making electrotypes from printing plates such as the method described above can now be used in forming electrotypes from plate 20.

Figures 3, 4, 5:
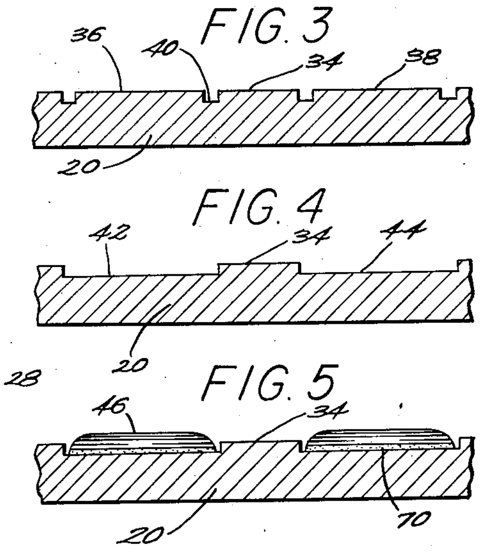
Figure 3 is an enlarged view in section of a printing plate showing printing areas and non-printing dead metal areas formed thereon.
Figure 4 is a view similar to Figure 3 showing the condition of the plate after the material of the plate in the non-printing dead metal areas has been removed.
Figure 5 is a view similar to Figures 3 and 4 showing the present invention applied in the routed non-printing areas.

When making certain types of molds from plate 20 it is desirable that the surface of the packing pieces 46 be above the printing surface 34. In such cases the gauge bearers 72 are made higher than the thickness of plate 20 so that the molded packing pieces 46 have their surfaces positioned above the printing surface 34 as is illustrated in Fig. 5 of the drawings.

It has been found by actual test that after setting in a heated press as described above, the packing material of the present invention can stand very high pressures. Samples have successfully withstood pressures up to five tons per square inch without depression of more than 0.001 inch.

Figure 12:
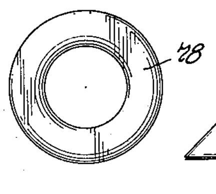
Figures 12, 13, 14 and 15 illustrate modified forms of the filling and packing material of the present invention.
Figure 13:
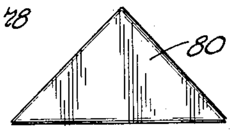
Figure 6:
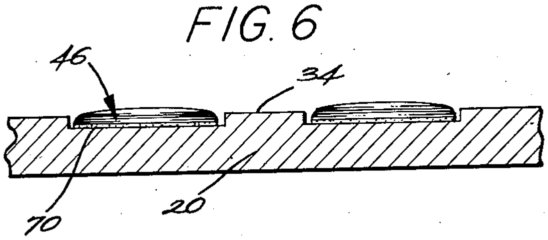
Figure 6 is a view similar to Figure 5 showing the filling material of the present invention positioned in the non-printing dead metal areas before curing of the filling material.
Figure 7:
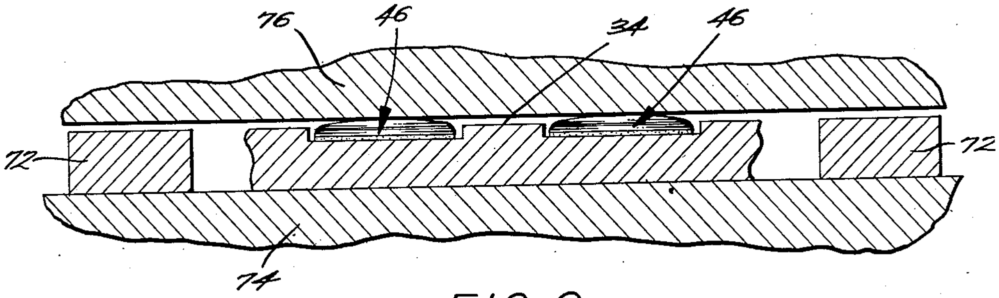
Figure 7 is a view showing the assembly of Figure 6 positioned in a press before application of press pressure thereto.

There are shown in Figs. 12 and 13 two other shapes in which the present invention can be made. In Fig. 12 an annular piece 78 has been shown and in Fig. 13 a triangular piece 80 has been shown. Other shapes of pieces can be made and various sizes of each shape can be made. The sheets of packing material of this invention can be readily cut by scissors to any desired irregular shape if necessary.

Although certain preferred examples of the present invention have been shown for purposes of illustration, it is to be understood that various changes and modifications can be taken therein. For example other suitable thermosetting resins can be used to impregnate the paper layers and other suitable paper to metal bonding agents or adhesives can be used in place of the adhesive given for purposes of illustration. The molding temperature could be higher or lower depending upon the thermosetting resin used provided that the time of heating was properly adjusted as is well known in the art. The invention is to be limited only as set forth in the following claims.

I claim:

1. The method of preparing electrotypes from a printing plate having routed non-printing areas thereon comprising adhering fibrous material impregnated with a thermosetting resin to the printing plate in the routed areas, compressing said impregnated fibrous material until the exposed surface thereof is at a desired height with respect to the surface of the printing area and curing the thermosetting resin, thereafter preparing a matrix from the printing plate, rendering the molded surface of the matrix electrically conductive, and plating an electrotype on the conductive surface of the matrix.

2. The method of preparing electrotypes from a printing plate having routed non-printing areas thereon comprising adhering creped paper impregnated with a thermosetting resin to the printing plate in the routed areas, compressing said impregnated fibrous material until the exposed surface thereof is at a desired height with respect to the surface of the printing area and curing the thermosetting resin, thereafter preparing a matrix from the printing plate, rendering the molded surface of the matrix electrically conductive, and plating an electrotype on the conductive surface of the matrix.

3. The method of preparing electrotypes from a printing plate having routed non-printing areas thereon comprising adhering compressible fibrous material impregnated with a thermosetting phenolic resin to the printing plate in the routed areas, compressing said impregnated fibrous material until the exposed surface thereof is at a desired height with respect to the surface of the printing area and curing the thermosetting resin, thereafter preparing a matrix from the printing plate, rendering the molded surface of the matrix electrically conductive, and plating an electrotype on the conductive surface of the matrix.

4. The method of preparing electrotypes from a printing plate having routed and non-printing areas thereon comprising adhering fibrous material impregnated with a thermosetting resin and having a sheet of aluminum applied to the exposed surface thereof to the printing plate in the routed areas, compressing said fibrous material until the upper surface of said sheet of aluminum is at a desired height with respect to the surface of the printing area and curing the thermosetting resin, thereafter preparing a matrix from the printing plate, rendering the molded surface of the matrix electrically conductive, and plating an electrotype on the conductive surface of the matrix.

5. The method of preparing electrotypes from a printing plate having routed non-printing areas thereon comprising the steps of placing packing material including creped paper impregnated with a thermosetting phenolic resin having an adhesive layer on one side thereof and an aluminum sheet on the other side thereof in the routed areas of the printing plate, curing the resin and activating the adhesive of said packing material under elevated temperature and pressures to adhere the packing material to the printing plate and to harden the packing material, thereafter preparing a matrix from the printing plate, rendering the molded surface of the matrix electrically conductive, and plating an electrotype on the conductive surface of the matrix.

6. The method of preparing electrotypes from a printing plate having routed non-printing areas thereon comprising the steps of applying a light film of talcum powder to the routed areas of the printing plate, placing packing material including creped paper impregnated with a thermosetting phenolic resin having an adhesive layer on one side thereof and an aluminum sheet on the other side thereof in the routed areas of the printing plate, curing the resin and activating the adhesive of said packing material under elevated temperature and pressures to adhere the packing material to the printing plate and to harden the packing material, thereafter preparing a matrix from the printing plate, rendering the molded surface of the matrix electrically conductive, and plating an electrotype on the conductive surface of the matrix.

7. Packing material for use in filling the routed non-printing areas of a printing plate prior to forming an electrotype therefrom comprising a sheet of compressible fibrous material impregnated with an uncured thermosetting resin, a thin sheet of metal adhered to one side of said fibrous sheet, and a layer of resin to metal adhesive on the other side of said fibrous sheet.

8. Packing material for use in filling the routed non-printing areas of a printing plate prior to forming an electrotype therefrom comprising a sheet of creped paper impregnated with an uncured thermosetting resin, a thin sheet of aluminum adhered to one side of said paper sheet, and a layer of resin to metal adhesive on the other side of said paper sheet.

9. Packing material for use in filling the routed non-printing areas of a printing plate prior to forming an electrotype therefrom comprising a sheet of compressible fibrous material impregnated with an uncured thermosetting phenolic resin, a thin sheet of aluminum adhered to one side of said fibrous sheet, and a layer of resin to metal adhesive on the other side of said fibrous sheet.

10. Packing material for use in filling the routed non-printing areas of a printing plate prior to forming an electrotype therefrom comprising a sheet of creped paper impregnated with an uncured thermosetting phenolic resin, a thin sheet of aluminum adhered to one side of said paper sheet, and a layer of vinyl resin-synthetic rubber adhesive on the other side of said paper sheet for adhering said packing material to a metal printing plate.

11. Packing material for use in filling the routed non-printing areas of a printing plate prior to forming an electrotype therefrom comprising a plurality of superimposed sheets of compressible fibrous material impregnated with an uncured thermosetting resin, a layer of adhesive between said sheets, a thin sheet of aluminum adhered to the exposed surface of one of the outermost sheets, and a layer of resin to metal adhesive on the exposed surface of the other of the outermost sheets.

12. A printing plate for use in making electrotypes comprising elevated printing areas and routed non-printing areas, and packing material adhered to said plate in the routed non-printing areas, said packing material including a sheet of compressible fibrous material impregnated with cured thermosetting resin.

13. A printing plate for use in making electrotypes comprising elevated printing areas and routed non-printing areas, and packing material adhered to said plate in the routed non-printing areas, said packing material comprising a sheet of compressible fibrous material impregnated with cured thermosetting resin and a thin sheet of aluminum adhered to the exposed side of said sheet of fibrous material.

References Cited in the file of this patent

UNITED STATES PATENTS

| | | |
|---|---|---|
| 799,945 | Schreiner | Sept. 19, 1905 |
| 2,151,024 | Gilbert | Mar. 21, 1939 |
| 2,280,985 | Toland et al. | Apr. 28, 1942 |
| 2,299,805 | Denman | Oct. 27, 1942 |
| 2,509,499 | Higgins | May 30, 1950 |
| 2,679,078 | Clark | May 25, 1954 |

OTHER REFERENCES

McLean et al.: GPO Bulletin PL–2, "Electrotyping in the GPO" 1949, 18 pp. text.